United States Patent
Brinkman et al.

[15] 3,653,920
[45] Apr. 4, 1972

[54] THIA-ALKANETHIOLS AS MEAT FLAVORS

[72] Inventors: Hendrik Willem Brinkman, Velp; Arnoldus van der Heyden, Zevenaar, both of Netherlands

[73] Assignee: Lever Brothers Company, New York, N.Y.

[22] Filed: June 18, 1970

[21] Appl. No.: 47,622

[52] U.S. Cl. ........................................99/140 R, 260/609 A
[51] Int. Cl. ..............................................A23l 1/26
[58] Field of Search..............................99/140 R; 260/609 A

[56] References Cited

UNITED STATES PATENTS

| | | | |
|---|---|---|---|
| 3,394,016 | 7/1968 | Bidmead et al. | 99/140 |
| 3,519,437 | 7/1970 | Giacino | 99/140 |
| 3,523,975 | 8/1970 | Evers et al. | 99/140 |

*Primary Examiner*—Morris O. Wolk
*Assistant Examiner*—Warren Bovee
*Attorney*—Louis F. Kline, Jr., Melvin H. Kurtz and Edgar E. Ruff

[57] ABSTRACT

A meat flavor is given or enhanced in foodstuffs by addition of thia-alkanethiols of formula $R^1-S-CH(SH)-R^2$ where $R^1$ and $R^2$ are methyl or ethyl radicals.

7 Claims, No Drawings

THIA-ALKANETHIOLS AS MEAT FLAVORS

The invention relates to methods of flavoring foods and methods of preparing the flavoring agents used for this purpose.

It has been discovered that sulphur compounds containing a thio-ether radical and a secondary mercapto radical, when included in foods impart a meat flavor to them or strengthen the meat flavor of these foods. The invention is characterized in that a thia-alkanethiol of the general formula I

$$R^1-S-\underset{\underset{H}{|}}{\overset{\overset{S\ H}{|}}{C}}-R^2 \qquad (I)$$

where $R^1$ and $R^2$, identical or different, represent a methyl or ethyl radical, or a salt of such a compound, is incorporated in a food. The compounds corresponding to formula I are new. A salt formed with a physiologically acceptable cation, preferably a sodium salt, is used as salt.

For preference 2-thiabutane-3-thiol of the formula $CH_3$-S-CHSH-$CH_3$ is used. Two or more thia-alkanethiols according to the invention may also be incorporated in the food. The invention relates more especially to strengthening the meat flavor of foods. It is known to add certain compounds to foods such as soups, meats, sauces, sauce cubes, imitation meat products, products for sprinkling on food, bouillon cubes, croquettes and ready meals in order to impart a meat flavor to them or to strengthen the meat flavor. For example, protein hydrolysates, monosodium glutamate, 5'-nucleotides, organic carboxylic acids and products from the reaction of pentoses with amino acids, especially cysteine, are used for this purpose. In addition, it has been suggested to use 2-methyl- or 2,5-dimethyl-4-hydroxy-2,3-dihydrofuran-3-one for this purpose. Although the products to which these compounds are added often have a meat flavor of their own, this flavor is often not sufficiently rounded off. The method according to the present invention enables this lack to be remedied.

A lower homologue of the compounds according to the invention, i.e. thiapropanethiol, is described as having a garlic odor. The odor of 2-thiabutane-3-thiol, for example, is not only less pronounced, but also of an entirely different type. The lower homoloque mentioned cannot replace the compounds according to the invention for the purposes stated. This difference in properties may be attributed to the nature of the mercapto radical. This radical is primary in thiapropanethiol and secondary in the compounds according to the invention. The meat flavor obtained with 2-thiabutane-3-thiol, for example, is completely absent in the case of thiapropane-thiol. It has also been noted that 2-thiapentane-3-thiol, 3-thiapentane-2-thiol and 3-thiahexane-4-thiol, also containing a secondary mercapto radical, produce the required effect.

Foods which can be flavored according to the invention are, in particular, foods ready for consumption for which it is appropriate to add a meat flavor, such as soups, ready meals, croquettes, sauce cubes and bouillon cubes. The compounds according to the invention may also be added to concentrated flavoring compositions such as powders for sprinkling on which are used to correct the taste of a dish, either in the kitchen or at the table.

The amount of flavoring agent present in the food ready for consumption varies from 0.1 to 1,000 mg. per 1,000 kg., preferably from 0.2 to 100 mg. per 1,000 kg. The exact quantity may be determined in each case by experiment. The sodium salt, for example, which is solid and non-volatile, is suitable for weighing out in small quantities.

The amount of flavoring agent in a concentrated flavoring composition, such as a powder for sprinkling on food, may also vary within wide limits depending among other things on the nature of the other substances present, a suitable quantity being, for example, from 1 to 25 mg./kg.

The compounds according to the invention are not stable in an aqueous medium and moreover they are very volatile. When adhering to strict conditions of temperature and time, it can be determined how much of the flavoring agent is left after sterilization of a canned product. As the degradation products do not appear to have an off-flavor or off-taste, an over-dose can be put in the product to be canned and sterilized, leaving the right flavoring amount after processing and preparing the food. For instance, it was found that an amount of 0.1 mg./kg. for a fat containing soup before sterilization at 120° C. for 30 min. was acceptable.

The compounds are more stable in solutions in apolar solvents, such as glyceride fats. Their rate of decomposition in an aqueous medium is not so large that they would not survive the preparation of foods. Their decomposition is retarded when they are dissolved in fat and thus escape attack by water. The flavoring compounds according to the invention can very well be used in dry products such as dry soup mixes and sprinkling powders.

The stability during storage can be enhanced by enrobing the compounds at issue, for example, with maltose-dextrin, gelatine, gum arabic and/or fat. This can be done by emulsification of the flavoring compound in an aqueous solution of maltose-dextrin, gelatine or gum arabic and elimination of the water in an appropriate way, or by dissolving it in a fat, and powdering this solution. Satisfactory products are also obtained by using mixtures of such enrobing agents. Very satisfactory products are obtained when a solution of a thia-alkanethiol in fat is enrobed by maltose-dextrin, gelatine or gum arabic or mixtures thereof. A preferred example of such a product is obtained by emulsifying a solution of the thia-alkanethiol in fat in a concentrated aqueous solution of maltose-dextrin and/or gum arabic, from which emulsion the water is subsequently expelled. Especially mixtures of maltose-dextrin and gum arabic are suitable.

Any emulsifying agent acceptable in the food may be used, but good results are obtained when milk powder is used.

A very satisfactory product is obtained by emulsifying 12 g of a solidified solution of the thia-alkanethiol in fat in a concentrated aqueous solution of 24 g. maltose-dextrin and 24 g. gum arabic using 4 g. defatted milk powder as the emulsifier, and eliminating the water from the emulsion obtained in any suitable way, e.g. by lyophilization or spray-drying. The flavoring agent is then dissolved in fat globules which are protected by the enrobing agents.

The products thus obtained appeared to be stable powders, which are also very suitable for dosing the flavoring agents according to the invention. The quantity of flavoring agent present in those powders is not strictly limited; a suitable preferred quantity is from 0.1 to 10 mg. per g. powder, but both smaller and greater amounts are likewise suitable.

It is also possible to dose the compounds according to the invention by mixing them with one of the constituents used in the preparation of the foods or with a proportion of such constituents or with a mixture of constituents. Instead of the actual flavoring agents, the stabilized enrobed forms mentioned above may also be used. These ingredients have to contain so much of the flavoring agent as required to obtain the rightly flavored food.

The compounds according to the invention may be used in conjunction with other substances useful for the required purpose. Thus it is possible to use one or more of the compounds belonging to one or more of the classes listed below, although the choice is not restricted to these compounds:

a. amino acids, which can be obtained by any traditional process from vegetable or animal proteins, such as gluten, casein, zein, soya protein etc.

b. peptides of similar origin, as well as peptides such as alanylalanine, alanylphenylalanine, alanylasparagine, carnosine and anserine;

c. nucleotides such as adenosine, guanosine, inosine, xanthosine, uridine and cytidine 5¹-monophosphates, as well as their amides, deoxy derivatives, salts; etc.

d. monocarboxylic acids, such as saturated or unsaturated fatty acids, for example those with two to 12 carbon atoms, lactic acid, glycollic acid and β-hydroxybutyric acid, as well as dicarboxylic acids such as succinic acid and glutaric acid;

e. pyrrolidonecarboxylic acid and its precursors;

f. natural sweeteners such as mono- and disaccharides, and artificial sweeteners such as saccharin and cyclamates;

g. 4-hydroxy-5-methyl-2,3-dihydrofuran-3-one and 4-hydroxy-2,5-dimethyl-2,3-dihydrofuran-3-one;

h. products from the reaction of sulphur-containing amino acids or hydrogen sulphide with reducing sugars or ascorbic acid, or the compounds mentioned under (g.) or lower aliphatic aldehydes and ketones;

i. sulphur compounds such as hydrogen sulphide, thiols, sulphides and disulphides, for example, dimethyl sulphide and diallyl sulphide; also 2-acetylthiazole and 2-acetyl-2-thiazoline;

j. guanidines, such as creatine and creatinine;

k. salts such as sodium chloride and mono- and di-sodium and ammonium phosphates;

l. organic phosphates, such as amino acids containing phosphorus;

m. nitrogen compounds which have not been mentioned above, such as ammonia, amines, urea, indole and skatole;

n. 4- and 5-alkanolides as well as the esters and salts of the corresponding hydroxy acids such as 5-decanolide, 5-dodecanolide, sodium 5-hydroxydecanoate and the glycerides of 5-hydroxy-alkanoic acids, such as the product from the reaction of 5-alkanolides with glycerol;

o. aldehydes such as ethanal, propanal, 4-heptenal; etc.

p. ketones, such as methylketones with, for example, five to 15 carbon atoms, biacetyl; etc.

q. 3-oxoalkanoates, such as glycerol esters;

r. tricholominic and ibotenic acid and their salts;

s. flavoring compounds such as O-aminoacetophenone, N-acetonylpyrrole, maltol, isomaltol, ethylmaltol, vanillin, ethylvanillin, cyclotene (2-hydroxy-3-methyl-2-cyclopentene-1-one), ethone [1-(p-methoxyphenyl)-1-pentene-3-one], coumarin, ethoxymethylcoumarin; etc.

t. alcohols, such as ethanol and octanol;

u. colorants, such as turmeric and caramel;

v. thickeners, such as gelatin and starch;

w. emulsifiers, such as the monoglycerides of diacetyltartaric acid. The quantity of these substances used depends on the nature of the food and that of the other ingredients added, such as herbs and spices, as well as on the odor or flavor desired.

The flavoring agents according to the invention may be coated with the substances listed above with the aid of maltose-dextrin, gelatine and/or gum arabic, or fat in order to make them into a stabilized enrobed form or they may be incorporated in one of the constituents used in the preparation of the food, as mentioned above.

The compounds according to the invention are new. They can be prepared by reaction of an alkanal $R^2$—CHO and an alkanethiol $R^1$—SH in the presence of hydrogen sulphide or an alkali metal or earth alkali metal sulphide or hydrogensulphide in an aqueous medium having a pH value from 3 to 8. This reaction has not been reported in the literature. To enlarge the solubility of the components in the aqueous medium, methanol or an other water soluble non-carbonyl solvent may be added. As already stated, the compounds to be prepared are not very stable in an aqueous medium; it is therefore advantageous to apply a two-phase system consisting of the aqueous medium, in which the reaction takes place, and an organic solvent such as dichloromethane, in which the reaction product is "stored" to await working-up. The pH value is preferably obtained by a buffer; a preferred pH range is from 4–7, 5–6 being most preferred.

The compounds according to the invention can also be prepared by other methods known for similar compounds. For instance, 1-alkylthio-1-halogeno-alkane can be converted with potassium hydrogen sulphide. A very suitable method is the conversion by reaction of a 1-alkylthio-1-halogeno-alkane of formula II with a thiocarbonic acid derivative of formula III or a tautomeric form thereof, in which $R^1$ and $R^2$ represent a methyl or an ethyl radical, X a halogen atom, Z an alkoxy group of one–eight carbon atoms or an amino group, Y is oxygen, sulphur or an imino group and A is a hydrogen, an alkali metal or an earth alkali metal atom, in an organic solvent medium, whereby an S-substituted 1-alkyl-thio-1-alkanethiol (IV) is obtained according to the reaction equation:

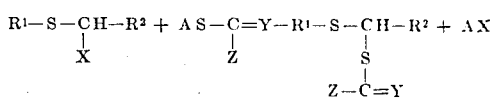

which is subsequently hydrolyzed to the thia-alkanethiol I. The compounds III with which the 1-alkylthio-1-halogeno-alkane II can react in this way are, for instance, thio-urea ($Z=NH_2$ $Y=NH$, $A=H$ give the tautomeric formula), or a salt of a monoester of mono- or dithiocarbonic acid. Good results were, for instance, obtained with potassium O-ethyl dithiocarbonate, and with thio-urea.

The following examples illustrate the invention.

EXAMPLE 1

66 g. (0.6 mol) of 1-methylthio-1-chloroethane (which can, for example, be prepared by the method described by H. Bohme and H. Bentler in Chem. Ber. 89 1465 (1956) were added drop by drop to a solution of 45.7 g. (0.6 mol) thio-urea in 1,600 ml acetone at ambient temperature. After a few minutes a turbid solution was obtained from which 100 g. of a white cristalline compound, S-(methylthioethyl)-isothiouronium chloride could be isolated by cooling with iced water, filtering and drying. Yield 89 percent, m.p. 92.5°–93° C.

The isothiouronium salt obtained (25 g.) was dissolved in 5N NaOH (26.8 ml.) in an atmosphere of nitrogen. This solution was left for 1 hour at ambient temperature, then poured into 5N NaOH (50 ml.) and extracted with 3 portions of 100 ml. ether each. The aqueous solution was acidified with 37 percent hydrochloric acid and the 2-thiabutane-3-thiol released was recovered by extraction with 3 portions of 100 ml. ether each. This ethereal extract (300 ml.) was washed with 3 portions of 25 ml. water each, then dried over anhydrous $MgSO_4$ after which the ether was expelled by distillation at ambient pressure in a current of nitrogen. The residual liquid was distilled at reduced pressure in a current of nitrogen, the fraction which boils at 66° C. at a pressure of 60 mm. Hg. being collected. In this way 5 g. of 2-thiabutane-3-thiol were obtained in the form of a mobile clear liquid, with a $n_D^{20}$ of 1.5236; the yield was 34 percent on the basis of the isothiouronium salt and 30 percent on the basis of the 1-methyl-thio-1-chloroethane.

The main absorption bands in the infra-red spectrum are at 2968, 2916, 2540, 1447, 1375, 1190, 1055, 952 and 693 $cm^{-1}$. The main peaks of the mass spectrum for m./e. are at 110 (3), 109 (1.5), 108 (34), 75 (100), 61 (57), 60 (36), 59 (45), 49 (12), 48 (19), 47 (45), 46 (10), 45 (56), 41 (23) and 35 (15), the figures in parentheses indicating the intensities relative to the highest peak for a m./e. ratio of 75. The nuclear magnetic resonance spectrum in carbon tetrachloride gave the following results: a singlet for $\sigma = 2.20$, a doublet for $\sigma = 1.64$, a doublet for $\sigma = 1.87$ and a multiplet for $\sigma = 3.94$, showing the presence of a $CH_3$—S radical, a $CH_3$ radical, a —S—H radical and a —C—H radical respectively (the $\sigma$ values are expressed in ppm in relation to tetramethyl silane as an internal standard).

EXAMPLE 2

The following compounds were prepared as described in Example 1:

A. 3-thiapentane-2-thiol, b.p. 35° C. at 8 mm. Hg., $n_D^{20} = 1.5133$, from 1-ethylthio-1-chloroethane. Yield: 14 percent.

The main absorption bands in the infra-red spectrum are at 2962, 2920, 2865, 2538, 1445, 1423, 1372, 1260, 1185, 1062, 970, 872 and 703 $cm^{-1}$. The main peaks of the mass spectrum for m./e. = 124 (0.5), 122 (6.5), 93 (1.5), 91 (2,5), 90 (2.5), 89 (47), 76 (13), 64 (2), 63 (7.5), 62 (49), 61 (72), 60 (67), 59 (77), 58 (44), 57 (30), 56 (6.5), 55 (3), 49 (2.5), 48 (1.5), 47 (42), 46 (14), 45 (100) and 41 (1.5), the figures in parentheses indicating the intensity of the peak relative to the highest peak for m./e. = 45.

B. 2-thiapentane-3-thiol, b.p. 52°-53° C./18 mm. Hg., $n_D^{20}$ = 1.5177, from 1-methylthio-1-chloropropane obtained by halogenation of methyl propyl sulphide.

The main absorption bands in the infra-red spectrum are at 2962, 2918, 2540, 1455, 1438, 1422, 1315, 1183, 1095, 1075, 958, 802, 745 and 710 cm$^{-1}$. The main peaks of the mass spectrum for m./e. = 124 (1), 122 (8.5), 93 (2), 91 (3.5), 89 (28), 88 (2), 76 (17), 75 (11), 74 (59), 73 (18), 72 (2), 71 (6), 69 (5), 61 (5.5), 59 (16), 58 (11), 57 (5.5), 50 (3.5), 49 (6.5), 48 (67), 47 (100), 46 (27), 45 (99), 42 (3.5) and 41 (83), the figures in parentheses indicating the intensity of the peak relative to that of the highest peak for m./e. = 47.

C. 3-Thiahexane-4-thiol, b.p. 56°-58° C. at 12 mm Hg; $n_D^{20}$ = 1.5053, from 1-ethylthio-1-chloropropane.

The main infrared absorption bands are at 2,967, 2,928, 2,872, 2,535, 1,713, 1,452, 1,376, 1,263, 1,179, 1,096, 1,076, 1,046, 970, 804 and 743 cm$^{-1}$. The main peaks of the mass spectrum are at m./e. 138 (2), 136 (24), 103 (78), 76 (56), 75 (100), 74 (35), 62 (41), 59 (28), 58 (26), 47 (65), 45 (78) and 41 (89), the figures in parentheses indicating the intensity of the peak relative to that of the highest peak for m./e. = 75.

EXAMPLE 3

An amount of 18.9 g. (0.17 mol) 1-methylthio-1-chloroethane was added dropwise to a suspension of 27.4 g (0.16 mol) potassium O-ethyl dithiocarbonate in 100 ml. dichloromethane at −5° C., while stirring. After everything had been added, stirring was continued for 20 hours, the temperature being maintained at −5° C. for 1 hour and then being allowed to rise to 0° C.; the reaction mixture was filtered and the solvent was evaporated while introducing nitrogen gas, leaving a liquid reaction product, which was fractionally distilled at reduced pressure, the stream of nitrogen gas being maintained; S—(1-methylthioethyl) O—ethyl dithiocarbonate was obtained as a clear, light-yellow liquid, yield 21.6 g (65%), b.p. 76° C./0.25 mm. Hg., $n_D^{20}$ = 1.5695.

An amount of 11.85 g (0.06 mol) S—(1-methylthioethyl) O—ethyl dithiocarbonate was dissolved in 300 ml. of a 0.4 M. sodium methoxide solution in methanol at ambient temperature under a nitrogen atmosphere and allowed to stand overnight. 900 ml. water were added, and the turbid mixture was extracted three times with 100 ml. portions of dichloromethane. The aqueous layer was acidified with 10 percent sulphuric acid and extracted three times with 100 ml. portions of dichloromethane. These extracts were dried with anhydrous magnesium sulphate. The solvent was evaporated while introducing nitrogen gas. The remaining liquid reaction product was fractionally distilled under reduced pressure, the stream of nitrogen being maintained; 2-thiabutane-3-thiol was obtained as a clear water-white mobile liquid, yield 2.5 g (38%, or 18% on 1-methyl-thio-1-chloroethane), $n_D^{20}$ = 1.5236, b.p. 66° C./60 mm. Hg.

EXAMPLE 4

Equimolar amounts (0.125 mol) of ethanal (5.5 g.), methane-thiol (6 g.) and sodium sulphide nonahydrate (30 g.) were dissolved in a two-phase mixture of 50 ml. dichloromethane and 100 ml. of an aqueous solution of 23.5 g. acetic acid and 20.5 g. sodium acetate (acetate buffer pH 5), present in a 250 ml. reaction flask fitted with a condenser cooled with dry ice/ethanol under a nitrogen atmosphere and closed with a mercury seal. The mixture was agitated with a magnetic stirrer. After a few hours dry ice cooling was no longer necessary. Stirring was continued for 3 days; then the two layers were separated. The aqueous layer was extracted with 20 ml. dichloromethane, the extract being added to the dichloromethane layer, which after being washed with water and dried with anhydrous sodium sulphate, was evaporated and worked up as described in Example 3, yielding 4.16 g. (38%) 2-thia-butane-3-thiol, b.p. 66° C./60 mm. Hg.

EXAMPLE 5

In the same way as described in Example 4 were prepared:
A. 3-thiapentane-2-thiol from ethanal and ethanethiol. Yield 26 percent, b.p. 57°-59° C./20 mm. Hg.
B. 2-thiapentane-3-thiol from propanal and methanethiol. Yield 31 percent, b.p. 52°-53° C./18 mm, $n_D^{20}$ = 1.5177.

EXAMPLE 6

In essentially the same way as described in Example 4, except that the dichloromethane was replaced by 50 ml. methanol, 3-thiahexane-4-thiol was prepared from propanal and ethanethiol. Yield 2 percent, b.p. 56°-58° C./12 mm. Hg.

Example 7

Sauce cubes were prepared in the usual manner from the following ingredients:

|  | Parts by weight |
|---|---|
| Powdered gelatine | 3 |
| Potato starch | 5 |
| Onion powder | 2.5 |
| Monosodium glutamate | 3 |
| Beef fat | 10 |
| Caramel | 0.8 |
| Pepper | 0.02 |
| Powdered bay leaf | 0.02 |
| Powdered cloves | 0.02 |
| Salt | 8 |
| Powdered protein hydrolysate | 4 |
| Powdered yeast extract | 1.5 |
| Tomato powder | 5 |

The sauce was prepared by boiling 43 g of these sauce cubes in 1 liter of water. The sauce thus obtained was divided into two equal portions. 0.5 μg. of 2-thiabutane-3-thiol dissolved in 0.25 ml. of water was added to the first portion. The two portions of sauce were subjected to an organoleptic test carried out by a panel of 13 persons, 10 of whom preferred the sauce flavored with 2-thia-butane-3-thiol because of its fuller, richer flavor reminiscent of roast meat.

EXAMPLE 8

As in Example 7, 1 liter sauce was prepared and divided into two equal portions. To the first portion, 0.5 μg. 3-thiapentane-2-thiol dissolved in 10 ml. water was added, to the second one, 10 ml. water. The two portions were compared in an organoleptic test, in which the sauce flavored with 3-thiapentane-2-thiol was preferred because of its fuller, more meaty flavor.

EXAMPLE 9

A paprika meat sauce was prepared from the following ingredients:

|  | g |
|---|---|
| Fresh (sweet) peppers, chopped | 80 |
| Paprika powder | 12 |
| Fresh onion, chopped | 100 |
| Tomato puree | 30 |
| Salt | 15 |
| Pepper | 1 |
| Garlic powder | 0.1 |
| Hardened fat | 30 |
| Wheat flour | 60 |
| Meat | 250 |
| Water to | 1000 |

The meat was browned with the fat in a frying pan. The onion and the chopped peppers were then added and allowed to stew gently. 200 g. of water and the remainder of the ingredients with the exception of the wheat flour were then added and the whole was brought almost to the boil. The wheat flour was mixed with 200 g. of water to thicken the sauce. The rest of the water was then added. The whole was left to cool to about 40° C., and the sauce was then divided into two half-liter portions. 0.2 $\mu$ g. of 2-thiabutane-3-thiol dissolved in 0.1 ml. of water was added to the first portion. The meat sauce flavored in this way was clearly preferred to the non-flavored sauce because of its flavor and smell which were fuller and more like those of meat.

EXAMPLE 10

A meat and vermicelli soup was prepared, and to this end 250 g. of beef were left to soak with 40 g. of salt in 2 liters of water for about 2 hours.

Another 3 liters of water were then added together with the following ingredients:

|  | g |
|---|---|
| Beef fat | 50 |
| Vermicelli | 200 |
| Chopped dried carrots | 25 |
| Dried onions | 2 |
| Dried leek | 25 |
| Monosodium glutamate | 15 |
| Meat extract | 5 |
| Casein hydrolysate | 15 |
| Bay leaf | 0.2 |
| Pepper | 1.2 |

The soup was then boiled for 10 minutes.

Two one-liter portions were taken from this soup and flavored as follows: 1 mg. of 2,5-dimethyl-4-hydroxy-2,3-dihydrofuran-3-one dissolved in 1 ml. of water was added to the first portion. 1 mg. of 2,5-dimethyl-4-hydroxy-2,3-dihydrofuran-3-one and 16 $\mu$ g. of 2-thiabutane-3-thiol dissolved together in 1 ml. of water were added to the second portion. The two portions were subjected to an organoleptic test carried out by a panel of 8 persons. The soup flavored with the combination of the two compounds was unanimously preferred. This preference is due to the strong beef flavor and smell.

EXAMPLE 11

One liter of sauce was prepared as described in Example 7. The sauce thus obtained was divided into two equal portions which were flavored as described below. 16 $\mu$ g. of 2-thiapropanethiol dissolved in 8 ml. of water was added to the first portion while 16 $\mu$ g. of 2-thiabutane-3-thiol also dissolved in 8 ml. of water was added to the second portion.

The two portions were subjected to a comparative organoleptic test carried out by a panel of 12 persons. Out of this group, 10 persons remarked that the sauce flavored with the 2-thiabutane-3-thiol was more reminiscent of the flavor of roast meat, while the sauce flavored with the 2-thiapropanethiol tasted and smelled more of onions and tomatoes.

EXAMPLE 12

To prepare an oxtail soup, 150 g. of oxtail was browned with 30 g. of beef fat. About 200 ml. of water, 16 g of salt, 4 g. of mono-sodium glutamate and 1 g. of mixed spices were then added, and the whole was left to simmer for 2 hours.

At the end of this operation, the bones were removed, and the following ingredients were added to the remainder:

| Protein hydrolysate | 5 g. |
|---|---|
| Dried onions | 5 g. |
| Tomato puree | 20 g. |
| Paprika powder | 0.3 g. |
| Water to | 1800 ml. |

This mixture was then brought to the boil and thickened by stirring in 60 g. of flour mixed with 200 ml. of water. The whole was then boiled for 10 minutes. The soup thus obtained was divided into two equal portions. 1 ml. of a solution containing 1 mg of 3-thiapentane-2-thiol per liter of water was added to the first portion.

The two soups were then subjected to a comparative organoleptic test carried out by a panel of nine persons, eight of whom preferred the soup to which the 3-thiapentane-2-thiol had been added because of its flavor and smell which were full and more like those of meat.

EXAMPLE 13

An easy-to-measure form of 2-thiabutane-3-thiol was prepared by mixing this compound with a solution of 50 percent maltose-dextrin in water, then lyophilising the solution. The powder thus obtained contained 1 mg. of 2-thiabutane-3-thiol per g.

EXAMPLES 14

An amount of 300 mg. 2-thiabutane-3-thiol was dissolved in 12 g. melted hardened fat at 55° C.

This solution was added to a solution of 24 g. maltose-dextrin and 24 g. gum arabic in 40 ml. water to which 4 g. defatted milk powder was added. The mixture was well mixed and then homogenized. When the homogeneous emulsion was formed, the mixture was cooled in ice and the treatment was continued for 2–3 minutes. The stable emulsion was spread on glass plates in 0.5 mm. thick layers with a thin layer applicator and dried in a stream of cold air. By scraping an almost odorless free-flowing powder was obtained which contained about 6 g water.

The amount of thiabutanethiol present was determined in model experiments using the $^{35}S$ or $^{14}C$ labelled compound of known radio-activity by known methods, viz. isotope dilution analysis, and was found to be 258 mg. Emulsions thus obtained were also freeze-dried and spray-dried, without the figures being affected. The amount of thiabutanethiol did not decrease after storage in vacuo over KOH for one night.

EXAMPLE 15

A powder for sprinkling on food was prepared by mixing the powder obtained according to Example 13 with the following ingredients:

|  | Parts by weight |
|---|---|
| Monosodium glutamate | 4 |
| Salt | 7 |
| Powdered protein hydrolysate | 4 |
| Pepper | 0.02 |
| Powdered bay leaf | 0.02 |
| Powdered cloves | 0.02 |
| Onion powder | 1.0 |
| Yeast extract | 1.5 |
| Maltose-dextrin containing the flavoring agent (1 mg/g) | 0.2 |

When 0.5 g. of this powder was sprinkled on 1 liter of beef soup (ready prepared) and mixed in, a beef soup with a fuller, stronger beef flavor was obtained.

EXAMPLE 16

In the same way as in Example 15 a sprinkling powder was prepared using maltose-dextrin powder containing 30 mg. 2-thiapentane-3-thiol per g. When 0.5 g. of this powder was sprinkled on 1 liter of beef soup (ready prepared) and mixed in, a beef soup was obtained which, because of its fuller, stronger beef flavour, was preferred by a tasting panel to a beef soup to which a sprinkling powder not containing the thia-pentanethiol had been added.

EXAMPLE 17

In the same way as in Example 15 a sprinkling powder was prepared using maltose-dextrin powder containing 50 mg. 3-thiahexane-4-thiol per g. When sprinkling 0.5 g. of this sprinkling powder on 1 liter of beef soup, and mixing it in, a soup was obtained which, because of its fuller and richer flavor, was preferred by 16 out of 18 members of a tasting panel to a soup to which a sprinkling powder not containing thia-hexanethiol had been added.

EXAMPLE 18

A dry goulash soup mix was prepared by mixing the following ingredients:

| | Parts by weight |
|---|---|
| Dried meat | 5 |
| Salt | 8 |
| Monosodium glutamate | 2 |
| Protein hydrolysate | 1 |
| Dried onions | 5 |
| Fried onions | 5 |
| Tomato powder | 4 |
| Paprika powder | 3 |
| Beef fat | 10 |
| Cornflour | 25 |
| Mixed spices | 4 |
| Maltose-dextrin powder containing 2-thiabutane-3-thiol (0.3 mg/g) | 1 |

73 g. of this mixture was mixed with 1 liter of water and the whole was simmered for 20 minutes.

Similarly 1 liter of soup was prepared from a mixture containing 1 g. of maltose-dextrin powder without the thiabutanethiol.

The two soups were subjected to a comparative organoleptic test carried out by a panel of 20 persons, 16 of whom preferred the soup flavored with the 2-thiabutane-3-thiol because of its more complete, stronger and more characteristic goulash flavor.

EXAMPLE 19

A dry goulash soup mix was prepared from the same ingredients as in Example 18, except that the maltose-dextrin powder was replaced by 0.08 parts of the maltose-dextrin/gum arabic powder prepared according to Example 14. The soup prepared from this mix was tested against a blank prepared with 0.08 parts of maltose-dextrin/gum arabic powder not containing the flavoring agent. Similar results were obtained as in Example 18.

EXAMPLE 20

A sprinkling powder was prepared from the same ingredients as in Example 15, except that the maltose-dextrin containing the flavoring agent was replaced by 0.3 parts of the powder obtained according to Example 14; 0.5 g of this powder was sprinkled on 1 liter of beef soup (ready-prepared) and mixed in. The soup thus flavored was tested by a panel consisting of 12 members against a blank soup on which a powder had been sprinkled with the same ingredients but without the powder according to Example 14. 10 panel members preferred the flavored beef soup.

What is claimed is:

1. A food having imparted or enhanced in it a meat flavour characterised in that at least one thia-alkanethiol of the general formula I

where $R^1$ and $R^2$ represent a methyl or an ethyl radical, or a salt of such a compound, has been incorporated in the food in an amount such that the food contains 0.1 to 1,000 mg. thia-alkanethiol per 1,000 kg.

2. Food according to claim 1, in which 2-thiabutane-3-thiol is used.

3. Food according to claim 1 in which the thia-alkanethiol used is encapsulated or enrobed.

4. Food according to claim 3, in which the encapsulating or enrobing agent is selected from glyceride fats and maltose-dextrine.

5. Food according to claim 3 in which the encapsulated or enrobed thia-alkanethiol is obtained by emulsifying a solution of the thia-alkanethiol in a glyceride fat in a concentrated solution of maltose-dextrin and/or gum arabic, from which emulsion the water is subsequently expelled.

6. Concentrated flavoring composition containing, in addition to other known substances, one or more thia-alkanethiols of the general formula I.

7. Thia-alkanethiols of the general formula I dissolved in a glyceride fat, the globules of which are encapsulated or enrobed by a mixture of maltose-dextrin and gum arabic.

* * * * *